United States Patent [19]

Lee

[11] Patent Number: 5,329,792

[45] Date of Patent: Jul. 19, 1994

[54] CONCEALED CAR LOCKING DEVICE FOR AUTOMATIC SHIFT LEVER

[76] Inventor: Chi-Yuan Lee, Back Building, No. 704-7, Chung-Cheng Rd., Hsin-Chuang City, Taiwan

[21] Appl. No.: 52,706

[22] Filed: Apr. 27, 1993

[51] Int. Cl.⁵ .............................................. B60R 25/06
[52] U.S. Cl. ............................................ 70/201; 70/247
[58] Field of Search ................................. 70/245–248, 70/201, 195, 251

[56] References Cited

U.S. PATENT DOCUMENTS 1,827,732 10/1931 Conlan ..................................... 70/251
5,081,856 1/1992 Hsu ....................................... 70/195 X

FOREIGN PATENT DOCUMENTS 764571 5/1934 France ................................. 70/247
WO86/06037 10/1986 PCT Int'l Appl. .................. 70/195
155058 12/1920 United Kingdom .................. 70/195

Primary Examiner—Lloyd A. Gall
Attorney, Agent, or Firm—Bacon & Thomas

[57] ABSTRACT

A locking device for an automatic shift lever on a car, having a housing provided at one side of the handle of the shift lever, an engaging lever, and a locating piece capable of rotating with a lock core received inside the housing. When a protruding end of the engaging lever is pressed inwardly, the locating piece will abut against a bottom edge of the engaging lever. In this position, a sleeve inside the handle has a slot which is engaged with a limiting end located on the top of the engaging lever, so that the shift lever is impossible to be moved.

1 Claim, 3 Drawing Sheets

CONCEALED CAR LOCKING DEVICE FOR AUTOMATIC SHIFT LEVER

BACKGROUND OF THE INVENTION

1. Field of the Invention

The invention relates to a car locking device, more particularly to a concealed lock which occupies less space and is easier to use than the known devices.

2. Description of the Prior Art

At present, there are various kinds of car burglar alarming apparatuses available on the market. These can be classified into alarm bells, steering wheel locks (so-called stick locks) and shift lever locks etc. The application theories and disadvantages of such kinds of burglar alarming apparatuses are described as follows:

1. An alarm bell uses the theory of equilibrium. When a car is shocked by any vibration, a switch will be activated and will produce buzzer sounds to surprise the thieves. However, if the car body is incidentally touched by a pedestrian, or even other cars passing by, it can also produce vibrations which result in noisy alarms to disturb other people. This burglar alarm is directly connected to the car battery to produce buzzer sounds and the car will run an electric leakage hazard during parking.

2. A steering wheel lock may use a lock which is arranged at the center of a cross bar, and such a lock can be firmly locked on the surface of a steering wheel. The length of the cross bar is longer than the diameter of a steering wheel, so as to limit the rotation of a steering wheel. Alternatively, a flexible hook lever may be used, having one end hooked to a steering wheel, another end hooked to the accelerator pedal to make a car impossible to move forwards, after the length is properly adjusted. Although such a lock can firmly lock the steering wheel, it is inconvenient to use. Therefore, a car driver is not willing to spend much time to use the steering wheel lock during temporary parking, and a car theft may usually happen in such a case.

3. A shift lever lock uses a lock firmly fixed on the car body at the rear side of the shift lever (please refer to FIG. 4). The connection hole of the lock should face the shift lever and by means of a U-shaped lock to match the connection hole the shift lever may be locked to make it impossible to move the shift lever back and forth. However, during opening and closing the lock, the driver must insert the key into the locking hole with one hand and, at the same time, has to snap the U-shaped hook into the lock with the other hand. Thus, it is very inconvenient to operate in the narrow space inside a car.

SUMMARY OF THE INVENTION

In view of the above problems, the present invention was thus created. The invention is characterized mainly in: that a housing is provided at one side of the handle of the shift lever, and an engaging lever and a locating piece interacting with the lock core are received inside the housing; that one end of the engaging lever protrudes from and is exposed outside the housing, while the other end abuts against a spring; that a locating piece is provided at the bottom of the engaging lever, its top abuts against a ratchet disposed at the bottom of the engaging lever, its bottom abutting against another spring, so as to achieve the easy locking function by means of the device according to the present invention.

Therefore, the main object of the present invention is to provide a concealed car locking device for an automatic shift lever. When the end of the engaging lever protruding from and exposed outside of the housing is pressed inside, the locating piece will engage a front ratchet disposed at the bottom edge of the engaging lever and the bottom of a sleeve will be engaged by a limiting end which is located on the top of the engaging lever, so that the shift lever cannot be moved for shift changing thereby achieving an easy locking function.

Another object of the present invention is to provide a concealed car locking device for an automatic shift lever in which, during locking the automatic shift lever, it is only required to press one end of the engaging lever, and no key is needed. Therefore, it is not only very easy and fast to operate, but also can prevent any car theft due to forgetting to lock or without locking when in a hurry.

BRIEF DESCRIPTION OF THE DRAWINGS

The above-mentioned and other objects, features and advantages of the present invention will be more apparent from the following description quoted on the basis of annexed drawings as follows.

DETAILED DESCRIPTION OF THE PREFERRED EMBODIMENT

Figure 1:
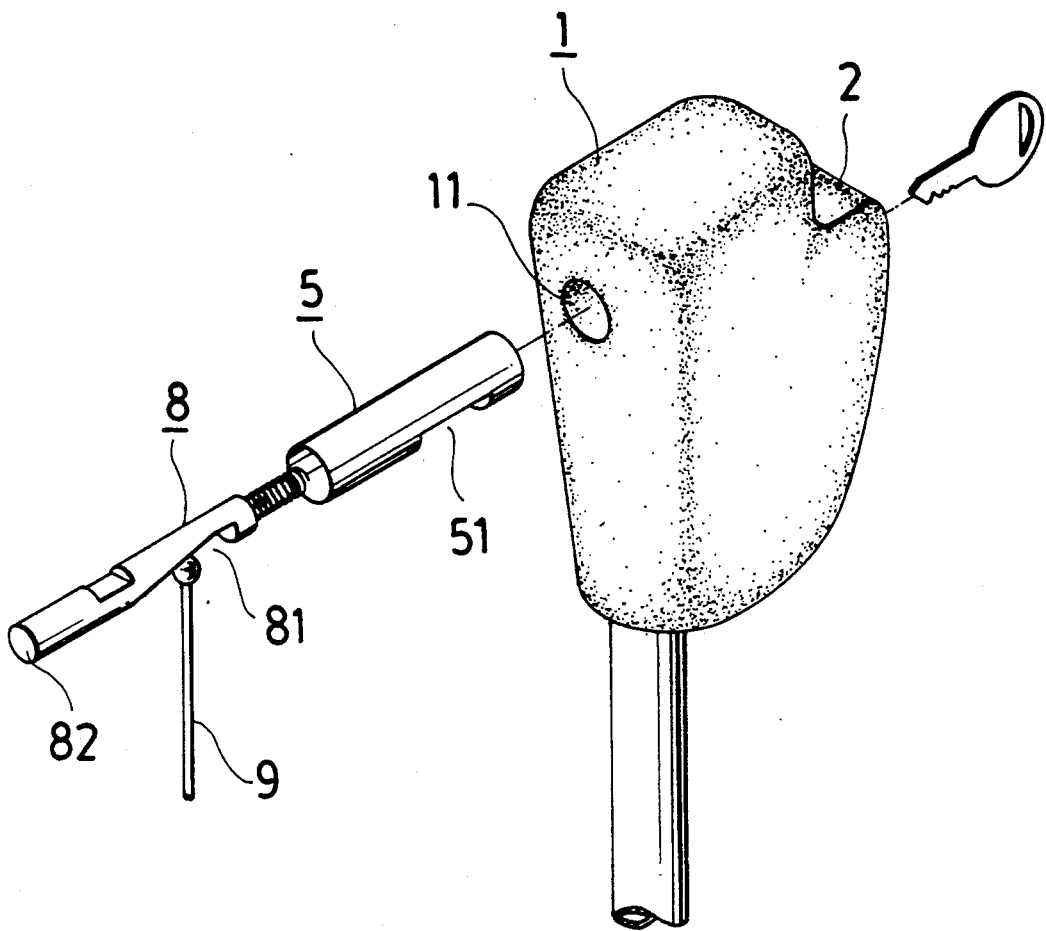
FIG. 1 is an exploded, perspective view of the structure of a concealed locking device according to the present invention which is assembled with a shift lever handle.
Figure 2:
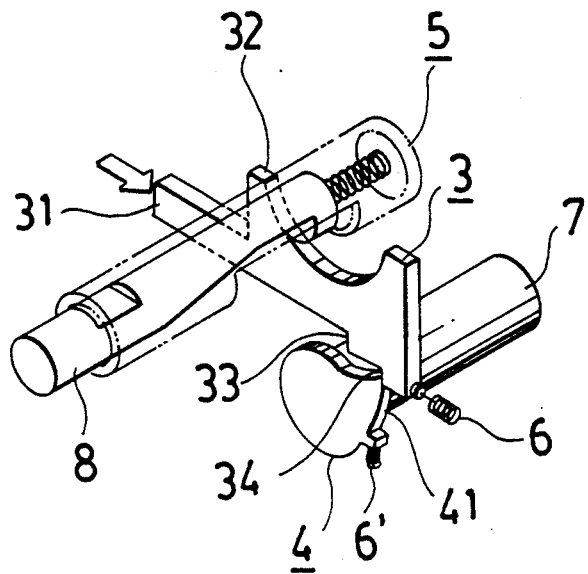
FIG. 2 is a partial, perspective view of the structure of the locking device according to the present invention in an unlocked condition.

Referring to FIG. 1, one can clearly see that the present invention of a concealed car locking device comprises a housing (2) disposed at one end of the shift lever handle (1), an engaging lever (3) and a locating piece (4) received inside the housing (2) (please refer to FIG. 2). The engaging lever (3) crosses a sleeve (5) disposed inside the handle (1), such that one end of the engaging lever (3) protrudes from and is exposed outside the housing (2) as a push-button (31), while the other end abuts against a spring (6). A limiting end (32) is provided on the center top of the engaging lever (3), and a front and a rear ratchet (33, 34) are respectively arranged at the bottom of the other end. The locating piece (4) is fixed on a lock core (7) and is located at the bottom of the other end of the engaging lever (3), and can be rotated with the lock core (7) extending near one side of the housing (2). A thrust piece (41) for engaging the front and rear ratchets (33, 34) is provided on the top of the locating piece (4), while the bottom of the locating piece (4) abuts against a spring (6'). A through hole (11) is provided on another side of the handle (1). (Please refer to FIG. 1 ). The above mentioned sleeve (5) is inserted inside the through hole (11). A slot (51) is formed on the bottom of a front end portion of the sleeve (5) and is exactly located on the top of the engaging lever (3). A control connecting rod (8) is provided inside the sleeve (5). A limiting slot (81) is provided on the control connecting rod (8) at a position corresponding to the slot (51) and the front end of the control connecting rod extends outside the handle (1) to form a knob (82). When a driver wants to change gears and presses down the knob (82), the limiting slot (81) can be moved so as to make a crown bar (9) inside the shift lever press downwards thus enabling the automatic shift lever to be moved back or forth to change gears.

Figure 3:
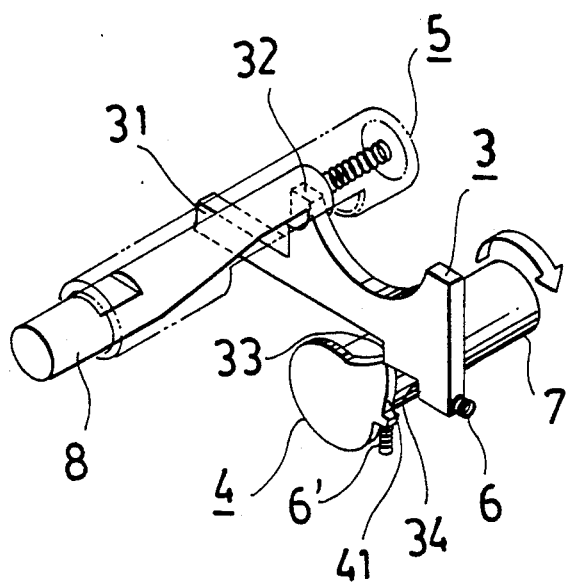
FIG. 3 is a partial, perspective view of the structure of a concealed locking device according to the present invention in a locked condition.
Figure 4:
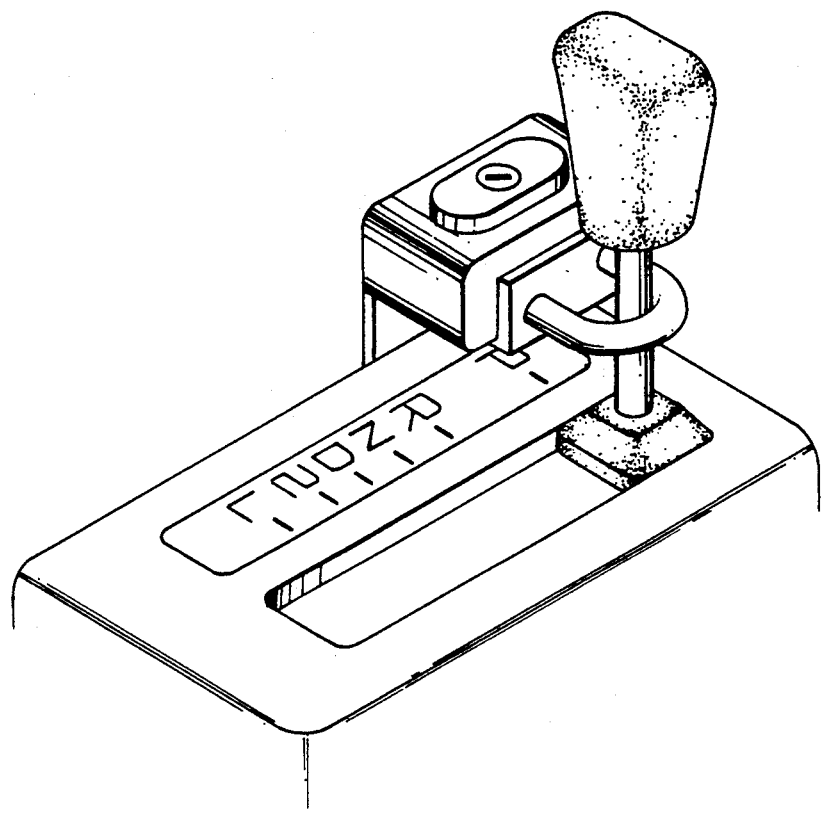
FIG. 4 is a perspective view of a conventional shift lever lock.

Under the unlocked condition of the present invention (refer to FIG. 2), the thrust piece (41) on the top of the locating piece (4) abuts against the rear ratchet (34) on the rear bottom of the engaging lever (3). At this moment, the limiting end (32) on the top of the engaging lever (3) is located at one side of the slot (51) of the sleeve (5) beyond the movement line of the control connecting rod (8), so that the control connecting rod (8) can be freely moved by pressing the knob (82). For locking the shift lever, simply press the push button (31) of the engaging lever (3) which is exposed on the front side of the housing (2), to make the engaging lever (3) move rearwards and compress the spring (6), so that the thrust piece (41) on the top of the locating piece (4) can abut against the front ratchet (33) on the bottom of the engaging lever (3) (as illustrated in FIG. 3). At this moment, the limiting end (32) on the top of the engaging lever (3) is located in the slot (51) of the sleeve (5) thereby making it impossible to press the control connecting rod (8) into the sleeve (5). Therefore, since the automatic shift lever is impossible to change gears, it can achieve the easy locking and a burglar proof function without the requirement of using a key. For unlocking, simply insert the key into the lock core (7) at one side of the housing (2) and turn it counter clockwise to make the thrust piece (41) of the locating piece (4) rotate downwards. When the engaging lever (3) is no more detained by the thrust piece (4), it will be moved forwards by means of the elasticity of the spring (6), so that the limiting end (32) will be removed from the slot (51) of the sleeve (5) and return to the unlocked condition as illustrated in FIG. 2.

Since the locking device according to the present invention is directly firmly locked on one side of the automatic shift lever, it does not occupy too much space, but also is very convenient to operate. Therefore, it can prevent car theft due to forgetting to lock or without locking in a hurry.

I claim:

1. A concealed car locking device for an automatic shift lever, comprising:

a housing disposed on one side of a handle of said shift lever;

an engaging lever located inside said housing, the engaging lever having a first end protruding from the housing forming a push button;

a sleeve disposed inside said handle crossing a plane of said engaging lever and defining a slot;

a shift lever control connecting-rod located inside said sleeve and having a front end extending outside said handle which end comprises a knob for shift changing;

a first spring abutting against said engaging lever, so as to bias the push button outwardly from the housing;

a rotatable lock core located in the housing;

a locating piece located in the housing at the bottom of said engaging lever, the locating piece fixed to said lock core so as to rotate therewith and having a second spring abutting against the locating piece;

a limiting end provided on the center top of said engaging lever;

a front and a rear ratchet formed on the bottom of said engaging lever;

a thrust piece for engaging one of said front and rear ratchets formed on said locating piece; whereby, when said engaging lever compresses said first spring when the push button is pressed into the inside of said housing, said thrust piece abuts against said front ratchet of said engaging lever, thereby locking said limiting end of said engaging lever in the slot defined in said sleeve, so that said knob of said control connecting-rod is unable to be pressed for gear changing; and, a key configured to be inserted into said lock core so as to rotate said lock core and said locating piece such that said thrust piece of said locating piece rotates out of contact with said front ratchet, thereby enabling said first spring to move said engaging lever to its original position.

* * * * *